US011063249B2

(12) United States Patent
Troegel (10) Patent No.: US 11,063,249 B2
(45) Date of Patent: Jul. 13, 2021

(54) METHOD FOR PRODUCING SI/C COMPOSITE PARTICLES

(71) Applicant: WACKER CHEMIE AG, Munich (DE)

(72) Inventor: Dennis Troegel, Ottensoos (DE)

(73) Assignee: Wacker Chemie AG, Munich (DE)

(*) Notice: Subject to any disclaimer, the term of this patent is extended or adjusted under 35 U.S.C. 154(b) by 301 days.

(21) Appl. No.: 15/999,049

(22) PCT Filed: Feb. 14, 2017

(86) PCT No.: PCT/EP2017/053215
§ 371 (c)(1),
(2) Date: Aug. 16, 2018

(87) PCT Pub. No.: WO2017/140645
PCT Pub. Date: Aug. 24, 2017

(65) Prior Publication Data
US 2020/0194778 A1 Jun. 18, 2020

(30) Foreign Application Priority Data
Feb. 17, 2016 (DE) .................. 102016202458.2

(51) Int. Cl.
*H01M 4/1395* (2010.01)
*H01M 4/04* (2006.01)
(Continued)

(52) U.S. Cl.
CPC ....... *H01M 4/1395* (2013.01); *H01M 4/0471* (2013.01); *H01M 4/1393* (2013.01);
(Continued)

(58) Field of Classification Search
CPC ............ H01M 4/1395; H01M 4/0471; H01M 4/1393; H01M 4/587; H01M 10/0525; H01M 4/625; H01M 4/366
See application file for complete search history.

(56) References Cited

U.S. PATENT DOCUMENTS 6,770,399 B2    8/2004  Umeno et al.
10,153,484 B2  12/2018  Lee et al.
(Continued)

FOREIGN PATENT DOCUMENTS

CN    101847711 A    9/2010
CN    103337613 A    10/2013
(Continued)

OTHER PUBLICATIONS

English PatBase Abstract corresponding to CN104300125.
(Continued)

*Primary Examiner* — Stewart A Fraser
(74) *Attorney, Agent, or Firm* — Brooks Kushman P.C.

(57) ABSTRACT

Composite Si/C particles containing silicon particles located within pores of a carbonaceous matrix are prepared by coating silicon particles with a sacrificial coating layer followed by coating with an organic carbon precursor to form precomposite particles. Thermal treating of the precomposite particles carbonizes the organic carbon precursor and releases the sacrificial material. The composite particles are useful in lithium ion battery anodes.

8 Claims, 2 Drawing Sheets

(51) Int. Cl.
  *H01M 4/1393* (2010.01)
  *H01M 4/587* (2010.01)
  *H01M 10/0525* (2010.01)
  *H01M 4/02* (2006.01)

(52) U.S. Cl.
  CPC ....... *H01M 4/587* (2013.01); *H01M 10/0525* (2013.01); *H01M 2004/021* (2013.01)

(56) References Cited

U.S. PATENT DOCUMENTS

| | | |
|---|---|---|
| 2007/0281216 A1 | 12/2007 | Petrat et al. |
| 2009/0130562 A1 | 5/2009 | Mao et al. |
| 2011/0311873 A1 | 12/2011 | Schulz et al. |
| 2012/0100438 A1 | 4/2012 | Fasching et al. |
| 2012/0156493 A1 | 6/2012 | Maisels et al. |
| 2013/0045423 A1 | 2/2013 | Lim et al. |
| 2013/0130115 A1 | 5/2013 | Park et al. |
| 2013/0323595 A1 | 12/2013 | Sohn et al. |
| 2014/0287315 A1* | 9/2014 | Troegel ............... H01M 4/134 429/231.8 |
| 2015/0118567 A1 | 4/2015 | Chen |
| 2016/0329555 A1 | 11/2016 | Lee et al. |
| 2016/0365567 A1 | 12/2016 | Troegel et al. |
| 2017/0047584 A1 | 2/2017 | Hwang et al. |

FOREIGN PATENT DOCUMENTS

| | | |
|---|---|---|
| CN | 104300125 A | 1/2015 |
| CN | 104319401 A | 1/2015 |
| CN | 105261733 A | 1/2016 |
| DE | 102009033251 A1 | 9/2010 |
| EP | 1730800 B1 | 5/2008 |
| JP | 2006228640 A2 | 8/2006 |
| KR | 20150050168 A | 5/2015 |
| KR | 20150078059 A | 7/2015 |
| KR | 20150128592 A | 11/2015 |
| WO | 2010006763 A1 | 1/2010 |
| WO | 2011006698 A | 10/2011 |
| WO | 2014031929 A1 | 2/2014 |
| WO | 2015051309 A | 4/2015 |
| WO | 2015117838 A1 | 8/2015 |

OTHER PUBLICATIONS

English PatBase Abstract corresponding to JP2006228640.
English PatBase Abstract corresponding to CN 104319401.
A.J. Appleby et al., J. Power Sources 2007, 163, pp. 1003-1039.
M. Rossi et al., Journal of Power Sources (2014) 246, pp. 167-177.
L.-Z. Fan et al. ChemElectroChem 2014, pp. 2124-2130.
L. Zhang et al._Journal of Materials Chemistry A_2013, 1, pp. 15068-15075.
Y.-K. Sun et al., Electrochimica Acta 58, 2011, pp. 578-582.
B. Li et al., Electrochemistry Communications 49 (2014), pp. 98-102.
J. Ahn et al., The Journal of Physical Chemistry C, 2015, 119, pp. 10255-10265.
L.-Z. Fan, The Jounal "The Royal Society of Chemistry 2014", Nanoscale, 2014, 6, pp. 3138-3142.
Z. Sun et al., Journal of the Electrochemical Society, 162 (8), pp. A1530-A1536 (2015).
L. Zhang, Electrochimica Acta 125 (2014), pp. 206-217.
Liu et al., Journal of Power Sources 286 (2015), pp. 534-539.
Y. Cui et al., Nature Nanotechnology, vol. 9, Mar. 2014, pp. 187-192.
Y. Cui et al._Nature Nanotechnology_2014_SuppInfo.
English Abstract corresponding to CN101847711 A.

* cited by examiner

METHOD FOR PRODUCING SI/C COMPOSITE PARTICLES

CROSS-REFERENCE TO RELATED APPLICATIONS

This application is a U.S. National Phase Application of PCT/EP2017/053215, filed Feb. 14, 2017, which claims priority to German Application No. 10 2016 202 458.2 filed on Feb. 17, 2016 the contents of which are incorporated herein by reference in their entireties for all purposes.

BACKGROUND OF THE INVENTION

The present invention relates to methods for producing Si/C composite particles, to the Si/C composite particles thus obtainable, and to the use thereof as active anode materials for lithium-ion batteries.

As storage media for electric power, lithium-ion batteries are at present the practical electrochemical energy stores having the highest energy densities. Lithium-ion batteries are utilized especially in the field of portable electronics, for tools, and also for electrically driven transport means, such as bicycles or automobiles. Graphitic carbon is currently widespread as a material for the negative electrode ("anode") of corresponding batteries. A disadvantage, however, is its relatively low electrochemical capacity of in theory not more than 372 mAh per gram of graphite, which corresponds to only about a tenth of the electrochemical capacity theoretically achievable with lithium metal. The development of alternative anode materials has led to the addition of silicon. Silicon forms binary electrochemically active alloys with lithium; these alloys can reach very high lithium contents and, for $Li_{4.4}Si$, for example, may achieve theoretical specific capacities in the region of 4200 mAh per gram of silicon.

The incorporation and release of lithium in silicon is associated, disadvantageously, with a very large change in volume, which can reach about 300%. Such volume changes subject the crystallites to severe mechanical loading, which may cause the crystallites ultimately to break apart. In the active material and in the electrode structure, this process, also referred to as electrochemical milling, leads to a loss of the electrical contacting and thus to the destruction of the electrode with a loss of capacity.

Moreover, the surface of the silicon anode material reacts with constituents of the electrolyte with continuous formation of passivating protective layers (Solid Electrolyte Interface; SEI), leading to the immobilization of lithium. Owing to the extreme change in volume of the silicon during the process of battery charging/discharging, the SEI regularly ruptures, whereby further surfaces of the silicon anode material are exposed, which are then subject to further SEI formation, so that during operation of the battery there is a continuous, irreversible loss of lithium ions. Since the amount of mobile lithium, corresponding to the utilizable capacity, is limited in the full cell by the cathode material, it is quickly consumed and the capacity of the cell drops to an extent which is unacceptable performance: wise, after just a few cycles.

The decrease in capacity over the course of a number of charging and discharging cycles is also referred to as fading or continuous loss of capacity, and is generally irreversible.

In order to solve these problems, a variety of different approaches have been pursued, as described for example by A. J. Appleby et al. in J. Power Sources 2007, 163, 1003-1039. The Si-containing active material is inserted customarily in the form of a physical mixture with graphite (EP 1730800) or as Si/C composite material into the active electrode materials (M. Rossi et al., J. Power Sources 2014, 246, 167-177). In Si/C composites, the silicon is incorporated into a carbon matrix.

For Si/C composites, various forms of embodiment have been described. Known, for example, are porous Si/C composites which contain pores distributed statistically over the entire material:

Si/C composites of this kind are obtainable, for example, by thermal decomposition of carbon precursors to form volatile decomposition products of low molecular mass and pores, as described in WO 10006763, for example. It is common for the C matrix to be admixed with specific pore-formers, which are distributed uniformly in the matrix and which break down into gaseous products when heated, generating pores as they do so. Established pore-formers are polyethylene glycols, polyalkylene oxides, sugars, or inorganic carbonates, as described in CN 101847711, WO 11006698, US 2013045423, JP 2006228640, or by L.-Z. Fan et al. in ChemElectroChem 2014, 1, 2124, L. Zhang et al. in J. Mater. Chem. A 2013, 1, 15068, or Y.-K. Sun et al. in Electrochimica Acta 2011, 58, 578. Also described, in US 2013130115, are porous, carbon-based materials. In that case, composites of $SiO_2$ and carbon were initially produced, from $SiO_2$ nanopowder and pitch, by carbonizing. Then $SiO_2$ was removed by etching and, finally, metal nanostructures were deposited on the surface and in internal pores.

Also known are Si/C composites which have pores distributed uniformly over the entire C matrix and also bear an external coating:

B. Li et al. in Electrochem. Comm. 2014, 49, 98 describe Si/C core-shell microspheres having a spherical cavity bounded by an external carbon coating. The cavity comprises a network of Si nanoparticles which are joined with amorphous carbon. U.S. Pat. No. 6,770,399 describes an Si/C composite particle which in its interior comprises a porous structure made of ground, nanoscale silicon particles and graphite particles, which are held together via an outer carbon layer, applied from benzene vapor by means of chemical vapor deposition (CVD). US 2013323595 describes a substrate provided by CVD methods with a graphitic carbon coating. WO 14031929 discloses composite particles based on a porous, conductive matrix, comprising particles of active material, and an outer coating. US 20120100438 claims composite structures having a core structure made from porous silicon and an outer coating.

Also known, furthermore, are methods for producing porous Si/C composites wherein silicon nanoparticles are embedded in macropores:

For this purpose, Si nanoparticles are very frequently coated first with inorganic templates, such as silicon dioxide, and subsequently with C precursors. The C precursors are carbonized and the inorganic templates are etched out using hydrofluoric acid or sodium hydroxide solution, for example, to form a pore around the Si particle. In this case, disadvantageously, separate process steps are required for the reaction of the C precursors and of the templates, leading on the one hand to an increase in production costs and on the other to a composite matrix which is not leaktight and which allows the etching media to reach the Si particles, as described for example in CN 104319401 or by J. Ahn et al. in J. Phys. Chem. C. 2015, 119, 10255; L.-Z. Fan et al. in Nanoscale 2014, 6, 3138; Z. Sun et al. in J. Electrochem. Soc. 2015, 162, A1530, or L. Zhang in Electrochimica Acta 2014, 125, 206. Z. Liu et al., by spray-drying a mixture of silicon nanoparticles, $SiO_2$ nanopowder, sucrose, and a carbon source, followed by carbonization, produced composite particles from which $SiO_2$ was etched out again by means of hydrofluoric acid (J. Power Sources 2015, 286, 534). CN 104300125 claims a method for producing porous, pomegranate-like Si/C composites having defined cavities in the C matrix, in which Si nanoparticles lie embedded. Y. Cui et al. (Nature Nanotechnology 2014, 9, 187) also describe porous, pomegranate-like Si/C composites having Si nanoparticles in defined cavities. In the methods of Cui et al., Si nanoparticles are first provided with an $SiO_2$ layer. The Si@$SiO_2$ particles thus obtained are aggregated into clusters coated with a carbon precursor. Carbonizing the carbon precursors and subsequently etching out the $SiO_2$ layer produced the porous Si/C composites. Because of the etching step, the Si/C composites are inevitably not impervious to liquid media. This is also apparent from the fact that the embedded Si nanoparticles can be etched out completely from the porous Si/C composites by an aqueous sodium hydroxide solution (see Nature Nanotechnology 2014, 9, 187; Supplementary Information).

Moreover, approaches to the coating of Si/C composites containing silicon particles in pore spaces have occasionally been described:

WO 2015051309 claims porous Si/C composites with pomegranate structure, as described in Y. Cui et al. (Nature Nanotechnology 2014, 9, 187). Furthermore, WO 2015051309 discloses the application of an external conductive coating (made of copper, for example) onto the porous Si/C composites, the intention of this being to raise the conductivity of the porous Si/C composites.

BRIEF SUMMARY OF THE INVENTION

Against this background, the object was to provide more efficient methods for producing Si/C composite particles. These Si/C composite particles ought to be constructed from a carbon matrix, containing silicon particles, and from a coating around the carbon matrix, the intention being that silicon particles should be embedded in a targeted way into pores in the carbon matrix. The production of the carbon matrix and the targeted embedding of silicon particles into pores in the carbon matrix ought to take place in one stage.

The Si/C composite particles thus obtainable ought to have advantageous performance properties when used in lithium-ion batteries, such as, for example, high cycling stability in charging and discharging events, minimal formation of SEI, in particular, or reduced electrochemical milling. The silicon particles in the Si/C composite particles ought also to be characterized by a high conductivity for lithium ions and/or by a high electrical conductivity.

Subject matter of the invention are methods for producing Si/C composite particles by
a) coating silicon particles with one or more sacrificial organic or inorganic materials,
b) coating the products from stage a) with one or more organic carbon precursors, to form precomposites,
c) thermally treating the precomposites from stage b), wherein the coating produced in stage b) and based on organic carbon precursors is carbonized and the sacrificial organic or inorganic material is released partly or wholly from the precomposites, to form porous composites, and
d) coating the porous composites from stage c) with one or more carbon coatings, leading to the Si/C composite particles.

A further subject of the invention are the Si/C composite particles obtainable by the aforesaid method.

As a result of the thermal treatment in stage c), the sacrificial materials are released and the organic carbon precursors are carbonized; as a result of this operating step, silicon particles are attached generally to the carbonized organic carbon precursors or to the resultant porous composites, and the silicon particles, leaving aside this point of attachment, are generally surrounded by a cavity or are located in a pore. With preference each silicon particle is embedded into a pore. Such pores come about in stage c) by the release of sacrificial material from the precomposite. As a result of the method steps of the invention, the silicon particles are located in pores and, moreover, are attached to the porous composite formed in stage c). The attachment is generally local, so that by far the greatest part of the surface of the silicon particles is surrounded by the cavity. The attachment is accomplished in general via amorphous carbon. At the attachment site, the porous composite or the amorphous carbon is linked to the silicon particle in general via chemical bonds, more particularly covalent bonds, or by physical interactions. This design of the Si/C composite particles has proved particularly advantageous for achieving the object of the invention, particularly with regard to the conductivity when using the Si/C composite particles in lithium-ion batteries. The conductivity of such Si/C composite particles may for example be $\geq 0.1$ S/m, preferably $\geq 20$ S/m, more preferably $\geq 200$ S/m, and most preferably $\geq 400$ S/m, and therefore, for example, may lie within the order of magnitude of established conductivity additive, ouch as conductive carbon black (~420 S/m). This property is also manifested electrochemically in effective utilization of the active material, of $\geq 80\%$ for example, preferably $\geq 90\%$, and more preferably $\geq 95\%$ of the theoretical capacity.

The silicon particles are preferably unaggregated, preferably unagglomerated and/or preferably not nanostructured.

Aggregated means that spherical or very largely spherical primary particles, of the kind formed, for example, first of all in vapor operations during the production of the silicon particles, coalesce in the further course of reaction in the vapor process, and in this way form aggregates. In the further course of reaction, these aggregates may form agglomerates. Agglomerates are a loose clustering of aggregates. Agglomerates can easily be split back into the aggregates using kneading or dispersing methods that are typically employed. Using these methods, aggregates cannot, or can only partly, be broken down into the primary particles. The presence of silicon particles in the form of aggregates or agglomerates may be visualized, for example, by means of conventional scanning electron microscopy (SEM). Static light scattering techniques for determining the particle size distributions or particle diameters of silicon particles are unable, in contrast, to distinguish between aggregate or agglomerates.

Non nanostructured silicon particles generally have characteristic BET surface areas. The BET surface areas of the silicon particles are preferably 0.01 to 30.0 $m^2/g$, more preferably 0.1 to 25.0 $m^2/g$, very preferably 0.2 to 20.0 $m^2/g$, and most preferably 0.2 to 18.0 $m^2/g$. The BET surface area is determined according to DIN 66131 (using nitrogen).

The silicon particles may be in crystalline or amorphous form, for example, and are preferably nonporous. The silicon particles are preferably spherical or sliver-like particles. Alternatively, though less preferably, the silicon particles may also have a fiber structure or be present in the form of silicon-containing films or coatings.

The silicon particles are generally submicro- or nanoscale. Silicon particles have volume-weighted particle size distributions with diameter percentiles $d_{50}$ of preferably ≥50 nm, more preferably ≥80 nm, very preferably ≥100 nm, and most preferably ≥150 nm. The stated diameter percentiles $d_{50}$ are preferably ≤800 nm, more preferably ≤400 nm, and most preferably ≤200 nm.

The volume-weighted particle size distribution can be determined in accordance with ISO 13320 by means of static laser scattering, employing the Mie model, using the Horiba LA 950 instrument, with ethanol as dispersing medium for the silicon particles.

The silicon particles may be based, for example, on elemental silicon, silicon oxide, or silicon/metal alloys. Elemental silicon is preferred, since it has the greatest storage capacity for lithium ions.

The silicon particles may consist preferably of high-purity polysilicon, or else of specifically doped silicon or metallurgical silicon, which may include elemental impurity. Moreover, it may be present alloyed with other metals dud elements, in the form of silicides, as for example with metals known from the literature such as Li, Sn, Ca, Co, Ni, Cu, Cr, Ti, Al, Fe, etc. These alloys may be in binary, ternary or multinary form. To increase the electrochemical storage capacity, the preference is for a particularly low level of foreign elements.

The surface of the silicon particles may have been chemically modified. Possible, typical surface functionalities are as follows: Si—H, Si—Cl, Si—OH, Si—Oalkyl, Si—Oaryl, Si-alkyl, Si—aryl, Si—Osilyl. Particularly preferred are surface groups which can attach physically or chemically to the carbonized organic carbon precursors or to the organic carbon precursors. The surface groups attached may contain functional groups and may alternatively be monomeric or polymeric. They may be attached to the Si surface only at one or more molecule chains, or may bridge a plurality of Si particles to one another.

The sacrificial materials may be inorganic or, preferably, organic in nature.

Examples of sacrificial inorganic materials are oxides, carbonates, carbides, nitrides or sulfides of the elements magnesium, calcium, tin, zinc, titanium, nickel. Specific examples of sacrificial inorganic materials are zinc oxide, magnesium carbonate, and nickel sulfide. In stage c), zinc oxide or nickel sulfide, for example, may be converted by means of carbothermal reduction into volatile compounds and released, and magnesium carbonate may form pores as a result of thermal decomposition and release of $CO_2$.

At a temperature selected from the range from 25 to 1000° C., typical sacrificial organic materials have a loss of mass of ≥50 wt %, preferably ≥80 wt %, and more preferably ≥90 wt %.

Examples of sacrificial organic materials are homopolymers or copolymers of ethylenically unsaturated monomers, as for example polyethylene, polypropylene, polystyrene, polybutadiene, poly-tert-butoxystyrene, polyvinyl chloride, polyvinyl acetate, polymethyl methacrylate, polyacrylic acid, polymethacrylate, polyvinyl stearate, polyvinyl laurate or copolymers thereof; polyvinyl alcohol; alkylene glycols, such as ethylene glycol, butylene glycol, diethylene glycol, triethylene glycol; polyalkylene oxides, such as polyethylene oxides, polypropylene oxides or copolymers thereof; gamma-butyrolactone, propylene carbonate; polyurethanes; and nitrogen-containing solvents, such as dimethylformamide, monoethanolamine, and N-methyl-2-pyrrolidinone (NMP).

Preferred sacrificial materials are polymers of ethylenically unsaturated monomers, polyalkylene oxides, and alkylene glycols. Particularly preferred sacrificial materials are selected from the group encompassing polyethylene, polystyrene, polymethacrylate, polyethylene oxide, polypropylene oxide, and polyethylene oxide-polypropylene oxide copolymers.

The coating of the silicon particles with sacrificial material may take place, for example, by physisorption or chemisorption processes.

In the case of physisorption processes, the sacrificial material is deposited on the surface of the silicon particles. There are physical interactions between the sacrificial material and the silicon particles.

One example of physisorption techniques are precipitation processes. In the case of precipitation processes, sacrificial material is precipitated, for example, from dispersions comprising sacrificial material, silicon particles, and one or more dispersion media. Dispersion media may be water and/or organic solvents, such as Alcohols or hydrocarbons. The sacrificial material may be precipitated in a conventional way, for example, by cooling, concentrating, or addition of precipitants or nonsolvents. Furthermore, electrostatic interactions between silicon particles and sacrificial material may also lead to physisorption.

The mixtures comprising precipitated sacrificial material may be dried directly or first centrifuged and/or filtered and optionally dried subsequently.

In the case of alternative physisorption processes, silicon particles and solutions of sacrificial material are mixed and subsequently dried.

The drying in the case of the physisorption processes may take place conventionally, as for example at elevated temperatures and/or reduced pressure. As an alternative, spray drying is also possible.

Chemisorption processes are preferred. With chemisorption, chemical bonds, more particularly covalent bonds, may be developed between the sacrificial material and silicon particles. Coated silicon particles produced accordingly can be processed advantageously in the further processing steps into Si/C composite particles of the invention. One example of chemisorption processes are grafting methods, such as grafting-to or grafting-from. Grafting may take place by conventional polymerization processes, as for example by means of radically initiated chain-growth addition polymerization, polycondensation, or polyaddition.

In the case of grafting-to, sacrificial material is generally attached to silicon particles, by means of an addition reaction, for example. The addition reactions may be radically initiated or may take place through hydrosilylation. For that purpose, for example, polymers may be reacted with silicon particles which carry silicon-hydrogen bonds on their surface. The reaction may be accomplished thermally, catalytically, as for example with transition metal compounds, such as platinum compounds, or by UV irradiation, or by addition of radical initiators, such as dibenzoyl peroxide or azoisobutyronitrile.

In the case of grafting-from, monomer building blocks for sacrificial materials are polymerized in the presence of silicon particles. In this process, monomers can be attached to the surface of the silicon particles. Grafting with ethylenically unsaturated monomers by radically initiated polymerization may be initiated with common radical initiators, such as dibenzoyl peroxide or azoisobutyronitrile, and carried out in a commonplace way per se. For the polyaddition it is possible, for example, to use silicon particles functionalized with epoxide groups or amine groups. Suitable monomers for the polyaddition accordingly carry, for example, amine or epoxide groups. Lastly, silicon particles bearing alcohol groups, more particularly those bearing phenol groups, may be used as monomer building blocks in the polycondensation of phenolic resins or resorcinol resins. Corresponding silicon particles bearing alcohol groups are obtainable, for example, by hydrosilylation of silicon particles bearing silicon-hydrogen bonds with ethylenically unsaturated alcohols.

The coating based on the sacrificial materials has a mean layer thickness in the range from preferably 5 to 700 nm, more preferably 20 to 300 nm, and most preferably 50 to 100 nm (method of determination: electron microscopy (SEM)). At one location at least, the coating based on the sacrificial materials has a layer thickness of preferably 1 to 300 nm, more preferably 20 to 200 nm, and most preferably 50 to 100 nm (method of determination: scanning electron microscopy (SEM)).

Suitable carbon precursors of stage b) are, for example, resorcinol-formaldehyde resin, lignin, and polyacrylonitrile.

In stage b) it is possible, optionally, to use one or more adjuvants. The adjuvants are based, for example, on carbon in various modifications, such as graphite, (conductive) carbon black, amorphous carbon, pyrolytic carbon, soft carbon, hard carbon, carbon nanotubes (CNTs), fullerenes, graphene, or on the elements Li, Fe, Al, Cu, Ca, K, Na, S, Cl, Zr, Ti, Pt, Ni, Cr, Sn, Mg, Ag, Co, Zn, B, P, Sb, Pb, Ge, Bi, rare earths, or combinations thereof. Preferred adjuvants are conductive carbon black, carbon nanotubes, Li, and Sn. The amount of adjuvants is preferably ≤1 wt % and more preferably ≤100 ppm, based on the total weight of the Si/C composite particles.

The products from stage a), the organic carbon precursors, and the adjuvants employed optionally are hereinafter also referred to jointly as reactants of stage b).

In stage b), the products of stage a) are coated with the further reactants of stage b) or embedded into the further reactants of stage b). The individual reactants of stage b) may all be used simultaneously or individually one after another.

For example, the reactants of stage b) may be mixed by grinding. In the case of grinding, the reactants of stage b) may be present in dry form or in the form of dispersions or solutions. Grinding is accomplished preferably with high energy, by means of (planetary) ball mills or vibrating disk mills, for example. Alternatively, the organic carbon precursors are first dissolved or dispersed in a solvent and subsequently the products from stage a) are added. Here it is possible for commonplace stirrers, Ultraturrax, dissolvers, intensive mixers, Speedmixers, or else ultrasound to be employed.

Examples of solvents for the dispersions or solutions during grinding, dispersing, or mixing are water or organic solvents, or mixtures thereof. Examples of organic solvents are alcohols, such as ethanol or propanol, dimethylformamide, or hydrocarbons, such as xylene. Preferred solvents selected are those in which the organic carbon precursors have good solubility but the sacrificial materials have poor or zero solubility. It is an advantage if the reactants of stage b) are readily wettable by the solvents.

The precomposites from stage b) can be isolated from the resultant dispersions in a variety of ways, as for example by precipitation methods and/or by drying, preferably in the same way as described for the isolation of the products of stage a).

In alternative methods for producing the precomposites, the products from stage a) may also be introduced into a melt of organic carbon precursors. Subsequent cooling and solidification of the melt results in precomposites.

Melt processes are preferred; solvent processes are particularly preferred.

Alternatively, the precomposites may also be obtained by preparing organic carbon precursors by means of polymerization in the presence of the products from stage a). For this purpose, commonplace monomer building blocks for organic carbon precursors may be employed. The polymerization may take place conventionally by radically initiated, chain-growth addition polymerization processes, or by means of polyaddition or polycondensation. In the case of radically initiated chain-growth addition polymerization, one or more ethylenically unsaturated monomers are polymerized, such as acrylonitrile. The polymerization may in this case be initiated thermally and/or by addition of radical initiators, such as dibenzoyl peroxide or azoisobutyronitrile. One example of polycondensation is the condensation of resorcinol and formaldehyde to give resorcinol-formaldehyde resin. One example of polyaddition is the addition reaction of bisphenol A diglycidyl ether with organic amines to form epoxy resins.

One or more additional coatings may be applied to the resultant precomposites, these coatings being based on organic carbon precursors and optionally adjuvants, in accordance with stage b).

The precomposites of stage b) may be used in wet or dry form in stage c). Prior to further processing, the precomposites of stage b) may be ground or freed by classifying technologies, such as sieving or sifting, from oversize or undersize material.

In stage c), the precomposites of stage b) are converted into porous composites.

The thermal treatment of the precomposite of stage b) takes place at temperatures of preferably 400 to 1400° C., more preferably 500 to 1200° C., and most preferably 700 to 1100° C.

The thermal treatment in stage c) may take place, for example, in a tube furnace, rotary tube furnace or a fluidized bed reactor. By choosing the type of reactor it is possible to carry out the carbonizing statically or with continual mixing of the reaction medium.

The thermal treatment is carried out preferably in an inert gas atmosphere, such as nitrogen or, preferably, argon atmosphere. The inert gas atmosphere may optionally further include fractions of a reducing gas, such as hydrogen. The thermal treatment is preferably accomplished anaerobically. The inert gas atmosphere may be situated statically over the reaction medium or may flow in the form of a gas stream over the reaction mixture. The flow rates in that case are preferably up to 1 liter per minute, more preferably 100 to 600 mL/min, and most preferably 250 mL/min, especially in the case of the carbonizing of 2 to 150 g of precomposites from stage b).

The heating rates on heating of the reaction mixture are preferably 1 to 20° C. per minute, more preferably 1 to 15° C./min, very preferably 1 to 10° C./min, and most preferably 3 to 5° C./min. Also possible, moreover, is a stepwise operation with different intermediate temperatures and intermediate heating rates. After the target temperature has been reached, the reaction mixture is customarily conditioned at the temperature for a certain amount of time or is subsequently immediately cooled. Hold times that are advantageous are from 30 min to 24 h, for example, preferably 1 to 10 h, and more preferably 2 to 4 h. Cooling may be carried out actively or passively, uniformly or in steps.

The resulting porous composites of stage c) may be employed directly in stage d). Alternatively, they may be aftertreated beforehand mechanically, by grinding or sieving, for example, and also freed from oversize or undersize material by classifying technologies (sieving, sifting).

The thermal treatment of the precomposite in stage c) accomplishes the carbonization of the organic carbon precursors. In this process, the organic carbon precursors are converted preferably into inorganic carbon.

The carbon yields in the carbonizing of the organic carbon precursors are preferably ≥15%, more preferably ≥20%, more preferably still ≥25%, very preferably ≥50%, and most preferably ≥70%, based on the total weight of the organic carbon precursors.

The porous composites of stage c) have volume-weighted particle size distributions with diameter percentiles $d_{50}$ of preferably ≥1 μm, more preferably ≥5 μm, and most preferably ≥10 μm. The porous composites have $d_{50}$ values of preferably ≤90 μm, more preferably ≤50 μm, very preferably ≤36 μm, and most preferably ≤20 μm. The volume-weighted particle size distribution can be determined in accordance with ISO 13320 by static laser scattering, employing the Mie model, using the Horiba LA 950 instrument with ethanol as dispersing medium for the porous composite particles.

In stage c), sacrificial material of the precomposite is released. As a result, pores are formed in the composite. The individual pores are preferably present in isolation. The pores are preferably not joined to one another via channels. The shape of the pores may for example be ellipsoidal, elongate, angular, sliverlike or, preferably, spherical.

The pore walls preferably have a thickness of 4 to 330 nm, more preferably of 24 to 240 nm, and most preferably of 50 to 146 nm (determination method: scanning electron microscopy (SEM)). The thickness of the pore walls refers to the shortest distance between two pores.

Because of the method of the invention, silicon particles are located in pores. The pores which contain silicon particles contain preferably ≤10, more preferably ≤5, more preferably still ≤3, and most preferably one silicon particle(s). The fraction of the silicon particles which are located in pores is preferably ≥5%, more preferably ≥20%, more preferably still ≥50%, very preferably ≥80%, and most preferably ≥90%, based on the total number of silicon particles in the porous composites of stage c) (determination method: scanning electron microscopy (SEM)).

The volume of a pore corresponds preferably to at least three times and more preferably at least 3.2 times, and most preferably at least 3.3 times the volume of the silicon particle located therein. The volume of a pore corresponds preferably to not more than 4 times and more preferably not more than 3.7 times, and most preferably not more than 3.4 times, the volume of the silicon particle located therein (method of determination: one minus [ratio of the apparent density (determined by means of xylene pycnometry in accordance with DIN 51901) and the skeletal density (determined by means of He pycnometry in accordance with DIN 66137-2)]).

The pores which contain silicon particles have diameters of preferably ≥60 nm, more preferably ≥80 nm, very preferably ≥160 nm, and most preferably ≥290 nm. The pores which contain silicon particles have diameters of preferably ≤1400 nm, more preferably ≤700 nm, very preferably ≤500 nm, and most preferably ≤350 nm (determination method: scanning electron microscopy (SEM)). The provisos relating to pore diameters are met preferably by the largest diameter of two, more preferably three, diameters that are orthogonal to one another. The volume of a silicon particle which is located in a pore is added to the volume of the pore when determining a pore diameter.

The ratio of the diameters of the pores containing silicon particles to the diameters of the silicon particles is preferably ≥1.1, more preferably ≥1.6, and most preferably ≥1.8. The aforesaid ratio of the diameters is preferably ≤3, more preferably ≤2.5, and most preferably ≤2 (determination method: scanning electron microscopy (SEM)).

The porous composites of stage c) are based preferably on carbon to an extent of 40 to 90 wt % and more preferably 60 to 80 wt %. The porous composites of stage c) contain preferably 10 to 60 wt % and more preferably 15 to 40 wt % of silicon particles. The figures in wt % are based on the total weight of the porous composites of stage c).

In stage d), one or more carbon coatings are applied to the porous composites of stage c).

In one variant of stage d), the porous composites of stage c) are first coated with one or more carbon precursors α), and subsequently the carbon precursors α) thus applied are carbonized by thermal treatment.

Following carbonization by means of thermal treatment, the carbon precursors α) afford generally high yields of carbon. The carbon yields are preferably ≥40%, more preferably ≥50%, and most preferably ≥70%.

Examples of carbon precursors α) of stage d) are tars or pitches, especially high-melting pitches, hard carbon (non-graphitizable at temperatures of 2500 to 3000° C.) or soft carbon (graphitizable at temperatures of 2500 to 3000'C). Particularly preferred are mesogenic pitch, mesophase pitch, petroleum pitch, and hard coal tar pitch.

The coating of the porous composites of stage c) with carbon precursors α) may take place, for example, in analogy to the description above in stage b) of the coating of the products from stage a) with carbon precursors.

The coated porous composites of stage c) obtained accordingly can then be carbonized by thermal treatment. This thermal treatment may be carried out in analogy to the description in stage c) for the carbonization of the precomposites of stage b).

In an alternative method for stage d), the porous composites of stage c) may be coated with carbon by means of chemical vapor deposition (CVD).

Examples of carbon precursors β) suitable for the CVD method are hydrocarbons, such as aliphatic hydrocarbons having 1 to 10 carbon atoms, more particularly 1 to 4 carbon atoms. Examples thereof are methane, ethane, propane, propylene, butane, butene, pentane, isobutane, hexane; unsaturated hydrocarbons having 1 to 4 carbon atoms, such as ethylene, acetylene or propylene; aromatic hydrocarbons, such as benzene, toluene, styrene, ethylbenzene, diphenylmethane or naphthalene; further aromatic hydrocarbons, such as phenol, cresol, nitrobenzene, chlorobenzene, pyridine, anthracene, and phenanthrene.

Preferred carbon precursors β) for the CVD method are methane, ethane, and, in particular, ethylene, acetylene, benzene or toluene.

In the CVD method, the porous composites of stage c) are heated preferably in a gas stream comprising one or more, generally gaseous, carbon precursors β). In the usual way, the carbon precursors β) decompose here on the hot surface of the silicon particles, and carbon is deposited. Generally it is possible for those CVD methods that are common knowledge to be employed.

Further surface modifications may be performed on the Si/C composite particles of stage d). It is also possible for one or more further coatings to be applied in stage d).

The Si/C composite particles preferably carry a carbon layer as topmost coating. The Si/C composite particles preferably carry the coating produced in stage d) as their topmost coating. The carbon coating of stage d), or the topmost coating of the Si/C composite particles, is preferably nonporous. The nonporosity may be characterized via the pore diameters.

The pores of the carbon coating applied in stage d) to the porous composites of stage c) are preferably ≤10 nm, more preferably ≤5 nm, and most preferably ≤2 nm. Not wanted are mesopores having pore diameters of, for example, >2 nm and more particularly >10 nm (determination method: pore size distribution according to BJH (gas adsorption) in accordance with DIN 66134).

The carbon coating, applied in stage d), of the Si/C composite particles has a porosity preferably of ≤2% and more preferably ≤1% (method for determining the total porosity: 1 minus [ratio of apparent density (determined by means of xylene pycnometry in accordance with DIN 51901) and skeletal density (determined by means of He pycnometry in accordance with DIN 66137-2)]). The carbon coating applied in stage d), or the topmost coating of the Si/C composite particles, is preferably impervious to liquid, preferably electrically conductive and/or preferably conductive for lithium ions. With particular preference the Si/C composite particles are impermeable to aqueous or organic electrolytes, acids or alkalis. The liquid-imperviosity of the Si/C composite particles is preferably ≥95%, more preferably ≥96%, and most preferably ≥97%. The liquid imperviosity may be determined, for example, in accordance with the method of determination specified later on below for the examples.

The Si/C composite particles may take the form, for example, of isolated particles or loose agglomerates. The Si/C composite particles may be in the form of slivers or flakes or, preferably, in spherical form.

The volume-weighted particle size distribution with diameter percentiles $d_{50}$ of the Si/C composite particles is preferably ≤1 mm, preferably ≤90 μm, more preferably ≤50 μm, and very preferably ≤20 μm, but preferably ≥1 μm, more preferably ≥5 μm, and most preferably ≥10 μm. Particle size distribution is preferably monomodal, but may also be bimodal or polymodal, and is preferably narrow. The volume-weighted particle size distribution of the Si/C composite particles is characterized by a value for $(d_{90}-d_{10})/d_{50}$ of preferably ≤1, more preferably ≤0.95.

The Si/C composite particles have RET surface areas of preferably ≤50 m$^2$/g, more preferably ≤20 m$^2$/g, and most preferably ≤10 m$^2$/g (determined in accordance with DIN 66131 (using nitrogen)).

The density of the Si/C composite particles is preferably ≥0.85 g/cm$^3$ and more preferably ≥1.00 g/cm$^3$ (determination method: xylene pycnometry in accordance with DIN 51901).

The carbon present in the Si/C composite particles may exclusively be a carbon obtained by carbonization.

Alternatively, further components may also be present as a source of carbon, such as, for example, graphite, conductive carbon black, carbon nanotubes (CNTs), or other carbon modifications. With preference a high fraction of the carbon in the Si/C composite particles is produced by carbonization in stages c) and d), preferably ≥40 wt %, more preferably ≥70 wt %, and most preferably ≥90 wt %, based on the total mass of the carbon in the Si/C composite particles. Alternatively, 40 to 90 wt % or 60 to 80 wt % of the carbon in the Si/C composite particles may have been produced by carbonization in stages c) and d), based on the total mass of the carbon in the Si/C composite particles.

The fraction of the coating produced in stage d) is preferably 1 to 25 wt %, more preferably 5 to 20 wt %, and most preferably 7 to 15 wt %, based on the total weight of the Si/C composite particles.

The Si/C composite particles are based on the porous composites of stage c) to an extent of preferably 80 to 95 wt % and more preferably 85 to 93 wt %, based on the total weight of the Si/C composite particles.

The Si/C composite particles contain preferably 5 to 50 wt %, more preferably 10 to 40 wt %, and most preferably 20 to 40 wt % of silicon particles. Carbon is present in the Si/C composite particles at preferably 50 to 95 wt %, more preferably 60 to 85 wt %, and most preferably 60 to 80 wt %. It is also possible, optionally for oxygen and preferably nitrogen to be present in the Si/C composite particles; they are present generally in chemically bonded form as heterocycles in the carbon structure, such as pyridine and pyrrole units (N), furan (O), or oxazoles (N, O). The oxygen content of the Si/C composite particles is preferably ≤20 wt %, more preferably ≤10 wt %, and most preferably ≤5 wt %. The nitrogen content of the Si/C composite particles is preferably in the range from 0.5 to 10 wt % and more preferably 2 to 5 wt %. The figures in wt % are based in each case on the total weight of an Si/C composite particle and add up in total to 100 wt %.

The Si/C composite particles may optionally comprise additional components, based for example on inactive materials, such as metals (e.g., copper), oxides, carbides, or nitrides. In this way the electrochemical stability can be positively influenced.

The Si/C composite particles generally have a surprisingly high stability under compressive load and/or shearing load. The compression stability and the shear stability of the Si/C composite particles are manifested, for example, in the Si/C composite particles, under compressive and/or shearing load, undergoing only little change, or none, in their diameter percentiles $d_{50}$ (volume-weighted particle size distribution).

The change in the diameter percentiles $d_{50}$ (volume-weighed particle size distribution) of the Si/C composite particles as a result of a compressive load of 17 MPa is preferably ≤15%, based on the diameter percentiles $d_{50}$ (volume-weighted particle size distribution) of the Si/C composite particles before the compressive load. The compression stability is measured by means of a hydraulic tablet press (from Specac) whose press mold (diameter 12 mm) is filled with Si/C composite particles (filling height: 0.5 cm) and then loaded with a weight of 0.2 t (17 MPa). The pressure applied is oriented on the pressure for the compaction of graphite electrodes to 1.6 g/cm$^3$.

The change in the diameter percentiles $d_{50}$ (volume-weighted particle size distribution) of the Si/C composite particles as a result of shearing load (dissolver; 16 m/s; 30 min) is preferably ≤15%, based on the diameter percentiles $d_{50}$ (volume-weighted particle size distribution) of the Si/C composite particles before the shearing load. For measurement of the shear stability, a dispersion of the Si/C composite particles in a solution of sodium carboxymethylcellulose (Na-CMC, Daicel 1380) (1.4% Na-CMC in water; weight ratio: Si/C composite particles to Na-CMC=90:10) is stirred (circulation speed 16 m/s) using a dissolver (Dispermat from Getzmann).

A further subject of the present invention is the use of the Si/C composite particles in electrode materials for lithium-ion batteries, more particularly for producing the negative electrodes of lithium-ion batteries.

The Si/C composite particles can be used as a silicon component for electrode materials of lithium-ion batteries. Lithium-ion batteries of this kind may be produced as described in WO 2015/117838, for example.

Advantageously, the embedding of the silicon into pores and into a carbon matrix can be accomplished in a single stage (stage c) of the invention)—a great advantage economically. Surprisingly, pores in the desired size have been obtained specifically around the silicon particles. There may therefore be no need for separate etching steps, of the kind widely described in the prior art for the generation of pores. In method step c) of the invention, moreover, there may be a characteristic, advantageous attachment of silicon particles to the carbon matrix of the Si/C composite particles, thereby allowing an improvement to be produced in the electrical contacting.

The Si/C composite particles produced in accordance with the invention have an advantageous, well-defined structural design, which on corresponding use of the Si/C composite particles in lithium-ion batteries, produces advantageous performance properties. The silicon particles are embedded in pores in the carbon matrix, and the size of the pores can be influenced. The pores have the capacity to buffer the expansion in volume of the silicon during the charging of a lithium-ion battery and so to reduce electrochemical milling. Furthermore, by virtue of the inventive design of the Si/C composite particles, the silicon particles can be protected against liquid media, and the formation of SEI, as a result of electrolytes, acids or alkalis, for example, in corresponding lithium-ion batteries can be reduced. Accordingly, during the operation of the lithium-ion batteries, it is possible to prevent or reduce the delamination of the SEI layer, thereby further reducing the SEI problem.

The Si/C composite particles of the invention are also surprisingly stable and mechanically robust and in particular possess a high compressive stability and a high shear stability. Under mechanical stress, the particles have less of a tendency to crumble than do conventional porous composite particles.

The particle size of the Si/C composite particles may be flexibly adjusted. In general, the composite particles are unaggregated and are notable for a narrow particle size distribution. This allows the materials to be processed more effectively into electrode inks and electrode coatings, and allows the distribution of the particles in the electrodes to be homogeneous. Moreover, this is useful in the production of robust lithium-ion batteries.

Si/C composite particles of the invention lead advantageously to lithium-ion batteries having high gravimetric capacities and, moreover, high volumetric capacities, and hence overall to lithium-ion batteries having high energy densities.

To all of these effects, the method steps of the invention and the characteristic features of the Si/C composite particles contribute synergistically.

DETAILED DESCRIPTION OF PREFERRED EMBODIMENTS

The examples which follow serve for further elucidation of the invention, but are not limiting on the scope of the invention.

Unless otherwise indicated, the examples hereinafter were carried out in an atmosphere of dry argon 5.0, at a pressure of 1013 mbar and a temperature of 23° C. The solvents were dried by standard methods and stored under a dry argon atmosphere.

Analytical methods and instruments used for the characterization were as follows:

Carbonization:

All the carbonizations carried out in the examples were carried out using a 1200° C. three-zone tube furnace (TFZ 12/65/550/E301) from Carbolite GmbH and using cascade regulation, including a type N probe thermocouple. The stated temperatures relate to the internal temperature of the tube furnace at the location of the thermocouple. Each starting material to be carbonized was weighed out into one or more fused-silica combustion boats (QCS GmbH) and introduced into a working tube made of fused silica. The settings and operating parameters used for the carbonizations are indicated in the respective examples.

Classifying/Sieving:

The Si/C powders obtained after the carbonization were freed from oversize >20 µm by wet sieving with an AS 200 basic sieving machine (Retsch GmbH) using water on stainless steel sieves. The Si/C powder was dispersed in ethanol by means of ultrasound (Hielscher UIS250V; amplitude 80%, cycle: 0.75; duration: 30 min) (20% solids content) and applied to the sieving tower with a sieve (20 µm). Sieving was carried out with an infinite time preselection and with an amplitude of 50-70%, with a traversing flow of water. The Si/C powder-containing suspension emerging at the bottom was filtered through 200 nm nylon membrane, and the filter residue was dried to constant mass in a vacuum drying oven at 100° C. and 50-80 mbar.

Scanning Electron Microscopy (SEM/EDX):

The microscopic studies were carried out using a Zeiss Ultra 55 scanning electron microscope and an INCA x-sight energy-dispersive x-ray spectrometer. Before being studied, the samples were vapor-coated with carbon, in order to prevent charging phenomena, using a Baltec SCD500 sputter/carbon coating unit. The cross sections of the Si/C composite particles that are shown in the figures were produced using a Leica TIC 3× ion cutter at 6 kV.

Inorganic Analysis/Elemental Analysis:

The C contents reported in the examples were determined using a Leco CS 230 analyzer, with O and optionally N and/or H contents being determined using a Leco TCH-600 analyzer. The qualitative and quantitative determination of other specified elements in the resultant core-shell composite particles were determined by means of ICP (inductively coupled plasma) emission spectrometry (Optima 7300 DV from Perkin Elmer). For this purpose the samples were subjected to acidic digestion (HF/HNO3) in a microwave (Microwave 3000 from Anton Paar). The ICP-OES determination is based on ISO 11885 "Water quality—Determination of selected elements by inductively coupled plasma-atomic emission spectrometry (ICP-OES) (ISO 11885:

2007); German version of EN ISO 11.885:2009", which is used for the analysis of acidic, aqueous solutions (e.g., acidified samples of drinking water, waste water, and other waters, aqua regia extracts of soils and sediments).

Particle Size Determination:

The particle size distribution was determined for the purposes of this invention in accordance with ISO 13320 by means of static laser scattering using a Horiba LA 950. When preparing the samples in the case of this determination, particular care must be expended on the dispersing of the particles in the measurement solution, so as not to measure the size of agglomerates rather than individual particles. For the Si/C composite particles under analysis here, the particles were dispersed in ethanol. For that purpose the dispersion prior to measurement, as and when required, was treated for 4 minutes with 250 W of ultrasound in a Hielscher UIS250v laboratory ultrasound unit with LS24d5 sonotrode.

Thermogravimetric Analysis (TGA):

Polymer contents after the coating of silicon nanoparticles were determined by means of thermogravimetric analysis with a Mettler TGA 851 thermobalance. Measurement was carried out under oxygen as measuring gas in the temperature range of 25-1000° C. and at a heating rate of 10° C./min. From the loss of mass in the 25-600° C. temperature range, it is possible to ascertain the fraction of organic materials (polymer coating). Using the same method, the ratio of different carbon modifications in a composite (conductive carbon black (CCB) as well as amorphous carbon (C)) was ascertained. Where conductive carbon black and C are present, the loss of mass in the 400-650° C. temperature range, resulting from combustion of the total carbon, takes place in two stages, and the C:CCB ratio reported in the relevant examples was determined from the ratio of said stages.

Surface Area Measurement by BET Method:

The specific surface area of the materials was measured according to the BET method via gas adsorption with nitrogen, using a Sorptomatic 199090 (Porotec) or SA-9603MP (Horiba) instrument.

Si Accessibility for Liquid Media (Liquid-Imperviosity):

The accessibility of silicon in the Si/C composite particles for liquid media was determined by the following test method on materials of known silicon content (from elemental analysis): 0.5-0.6 g of Si/C composite particles was first dispersed by ultrasound with 20 ml of a mixture of NaOH (4M; $H_2O$) and ethanol (1:1 vol.), and the dispersion was subsequently stirred at 40° C. for 120 minutes. The composite particles were filtered through a 200 nm nylon membrane, washed to neutral pH with water, and then dried in a drying oven at 100° C./50-80 mbar. The silicon content after the NaOH treatment was determined and was compared with the Si content prior to the test. For a relative change in the Si content of ≤5%, the composite structure is considered to be impervious (corresponding to an imperviosity of ≥95%).

Theoretical Capacity:

The theoretical capacity reported in the examples for the Si/C composite particles obtained was not determined experimentally, but was instead calculated from the elemental composition of the materials. The basis used for this calculation comprised the following capacities of the pure components: Si 4199 mAh/g; (amorphous) carbon 100 mAh/g; N (as part of the amorphous C matrix) 100 mAh/g. Furthermore, it was assumed in the calculation that O contents present in the composites are present in the form of $SiO_2$ and therefore reduce the contribution of the active silicon, taking account of the $SiO_2$ content.

The following materials were procured from commercial sources or produced in-house and were used directly without further purification:

a suspension of silicon nanopowder (sliverlike, unaggregated Si particles, produced in-house by wet milling, in a stirred ball mill, in ethanol (solids content 22 wt %, $d_{50}$=180 nm) or 2-propanol (solids content 20 wt %; $d_{50}$=200 nm)), polyacrylonitrile (Mw=150 000; Sigma-Aldrich), dimethylformamide (DMF; extra pure; Siqma-Aldrich), polyethylene oxide-polypropylene oxide copolymer (Pluronic P123®; Sigma-Aldrich), acrylic acid (99%, Sigma-Aldrich), azobis(isobutyronitrile) (AIBN; Sigma-Aldrich), toluene (Brenntag GmbH), pitch (high-melting; softening point 235° C.).

EXAMPLE 1

Coating of Silicon Nanopowder with a Pore-Forming Polymer (Polyacrylic Acid):

A silicon nanopowder suspension (25 g, 20 wt %, $d_{50}$=200 nm in 2-propanol; corresponding to 5 g of nano-silicon) was admixed with 50 ml of toluene, and 2-propanol was removed by distillation. The resulting suspension was diluted with 80 ml of toluene and redispersed using ultrasound (Hielscher UIS250V; amplitude 50%, cycle: 0.9; duration: 5 min). 115 mg of azobis(isobutyronitrile) (AIBN) and 5 g of acrylic acid were added, and the reaction mixture obtained was subsequently stirred at 100° C. for 3 h and cooled to room temperature over the course of 14 h. The particles were separated off by centrifugation (5 min, 6000 rpm), washed with toluene, and dried under reduced pressure (80° C., 10-2 mbar, 3 h). Elemental composition: C 27.3 wt %; O 26.3 wt %; N 0.5 wt %; H 3.8 wt %;

Composition of the uncoated starting material: C 2.1 wt %; O 4.4 wt %; N 0.2 wt %; H 0.5 wt %;

Polymer content (TGA): 49 wt %.

Figure 1:
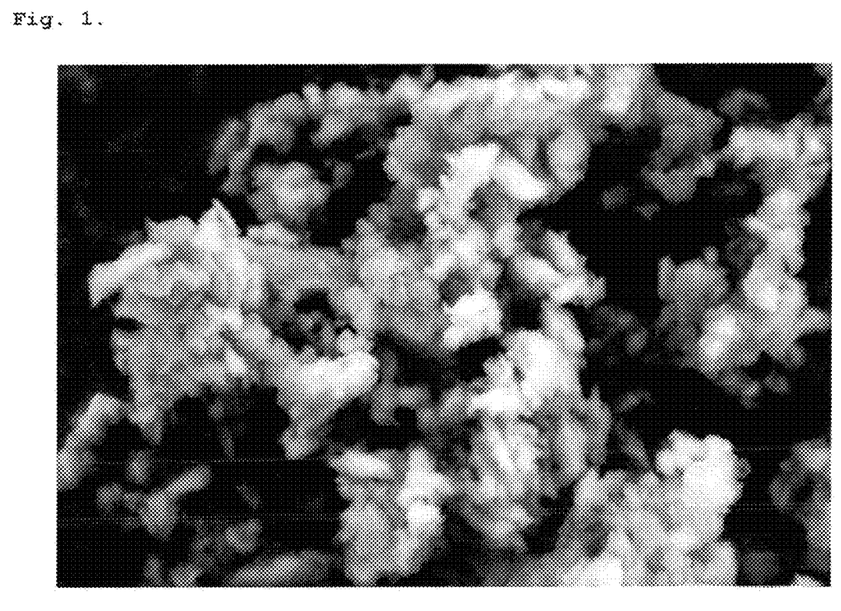
FIG. 1 shows an SEM micrograph of the polyacrylic acid-coated silicon nanoparticles of example 1 in 30,000-times magnification.

FIG. 1 shows an SEM micrograph of the polyacrylic acid-coated silicon nanoparticles of example 1 in 30,000-times magnification. The original, slivery structure of the silicon nanoparticles is still in evidence; the soft surfaces and edges demonstrate a uniform, homogeneous polymer coating.

EXAMPLE 2

Embedding of Polymer-Coated Silicon Nanoparticles into a Carbon Precursor (Polyacrylonitrile):

Polymer-coated silicon nanopowder (27.6 g; containing 3.6 g of silicon and 24 g of polyethylene oxide-polypropylene oxide copolymer (Pluronic P123®)) was dispersed in a solution of 48 g of polyacrylonitrile (PAN) in 3200 ml of DMF by means of ultrasound (Hielscher UIS250V; amplitude 80%, cycle: 0.9; duration: 30 min). The resulting dispersion was sprayed and dried using a laboratory spray-dryer of type B-290 (BÜCHI GmbH) with B-295 inert loop and B-296 dehumidifier (BÜCHI GmbH) (nozzle tip 0.7 mm; nozzle cap 1.4 mm; nozzle temperature 180° C.; $N_2$ gas flow 30; aspirator 100%; pump 20%).

This gave 64.8 g of a fine, brown powder (precomposite) (yield 86%).

EXAMPLE 3

Carbonization of a Precomposite:

31.3 g of the precomposite obtained in example 2 were placed in a fused silica boat (QCS GmbH) and carbonized in a three-zone tube furnace (TFZ 12/65/550/E301; Carbolite GmbH), using cascade regulation including a type N sample element with argon/H$_2$ as inert gas; first heating rate 10° C./min, temperature 300° C., hold time 90 min, Ar/H$_2$ flow rate 200 ml/min; thereafter continuing directly with heating rate 10° C./min, temperature 1000° C., hold time 3 h, Ar/H$_2$ flow rate 200 ml/min. After cooling, 9.00 g of a black powder were obtained (carbonization yield 29%), which was freed from oversize by wet sieving. This gave 3.89 g of porous composite particles with a particle size of d$_{99}$<20 μm.

Elemental composition: Si 15.8 wt %; C 75.2 wt %; O 4.58 wt %; N 4.25 wt %; B<50 ppm; P 200 ppm; Al<50 ppm; Ca<50 ppm; Cu<10 ppm; K 340 ppm; Li<10 ppm; Zr 720 ppm;

Particle size distribution: monomodal; d$_{10}$: 8.03 μm, d$_{50}$: 13.6 μm, d$_{90}$: 20.9 μm; (d$_{90}$−d$_{10}$)/d$_{50}$=0.95;

Specif. surface area (BET)=23.1 m$^2$/g;
Si imperviosity: 92.4% (not impervious to liquid);
Theoretical capacity: 573 mAh/g.

EXAMPLE 4

Coating of a Porous Composite with a Dense Carbon Film Based on Pitch Precursors:

3.89 g of the porous composite particles obtained in example 3 were dispersed together with 630 mg of pitch (high-melting; softening point 235° C.) in 60 ml of p-xylene by means of ultrasound (Hielscher UIS250V; amplitude 80%, cycle: 0.9; duration: 30 min). The suspension was stirred under reflux for 90 min and cooled to room temperature over the course of 14 h. The solvent was removed under reduced pressure, and the pitch-coated composite particles were transferred into a fused silica boat (QCS GmbH) and carbonized, using cascade regulation including a type N sample element with argon/H$_2$ as inert gas; first heating rate 10° C./min, temperature 250° C.; thereafter continuing directly with heating rate 5° C./min, temperature 550° C.; thereafter continuing directly with 10° C./min, 1000° C., hold time 2 h, Ar/H$_2$ flow rate 200 ml/min. After cooling, 3.99 g of a black powder were obtained (carbonization yield 88%), which was freed from oversize by wet sieving. This gave 3.06 g of porous Si/C composite particles having a dense outer C coating and having a particle size of d$_{99}$<20 μm. Elemental composition: Si 13.2 wt %; C 79.4 wt %; O 3.58 wt %; N 3.79 wt %; B<50 ppm; P<200 ppm; Al<50 ppm; Ca<50 ppm; Cu<10 ppm; K 342 ppm; Li<10 ppm; Zr 669 ppm;

Particle size distribution: monomodal; d$_{10}$: 7.92 μm, d$_{50}$: 12.9 μm, d$_{90}$: 19.6 μm; (d$_{90}$−d$_{10}$)/d$_{50}$=0.91;

Specif. surface area (BET)=2.2 m$^2$/g;
Si imperviosity: 97.7% (impervious to liquid);
Theoretical capacity: 506 mAh/g.

Figure 2:
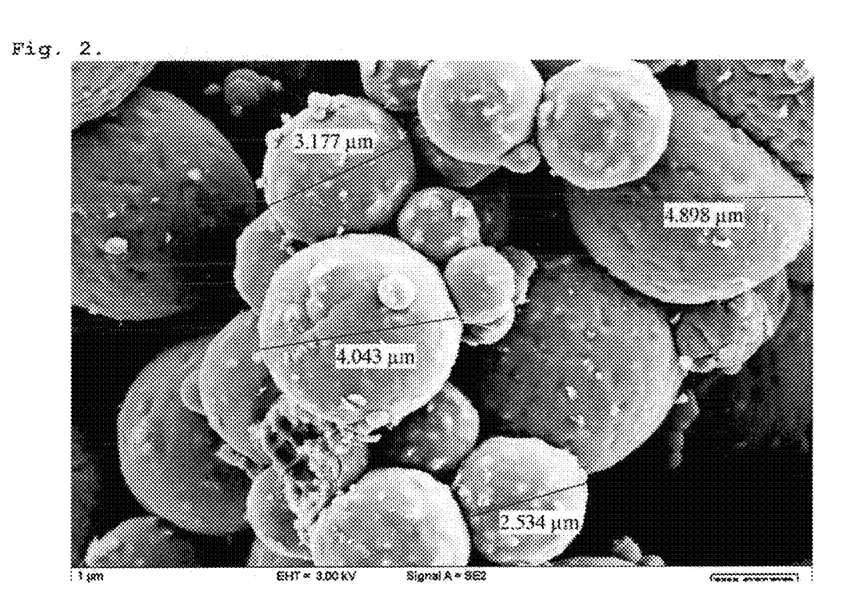
FIG. 2 shows the SEM picture of the Si/C composite particle obtained in example 4 at 7,500-times magnification.

FIG. 2 shows the SEM picture of the Si/C composite particle obtained in example 4 (7500-times magnification). The surface is smooth and continuous and therefore impervious to liquid.

Figure 3:
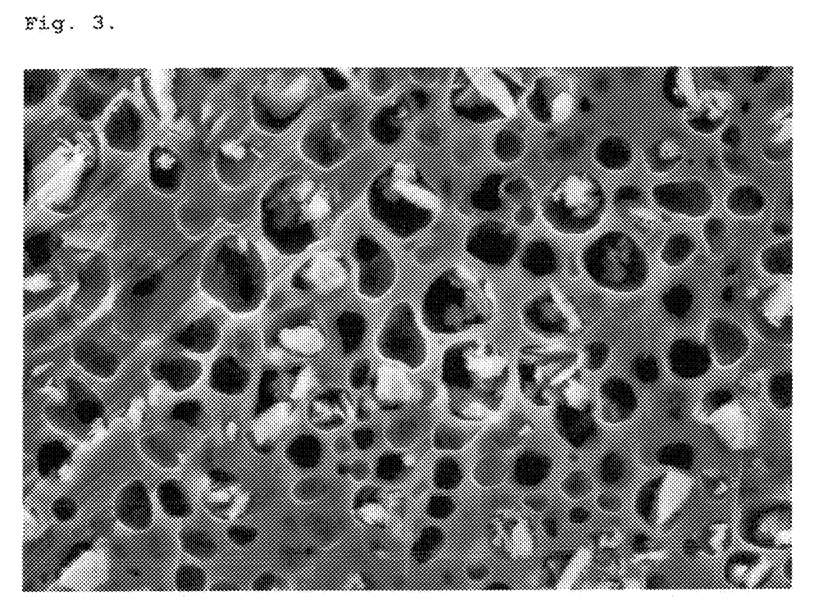
FIG. 3 shows an SEM section through Si/C composite particle for example 4 in 30,000-times magnification.

FIG. 3 shows an SEM section through an Si/C composite particle from example 4 (30,000-times magnification). The silicon particles are embedded into local macropore spaces, which are able to buffer the expansion in silicon volume when corresponding lithium-ion batteries are being charged.

EXAMPLE 5 (COMPARATIVE)

Figure 4:
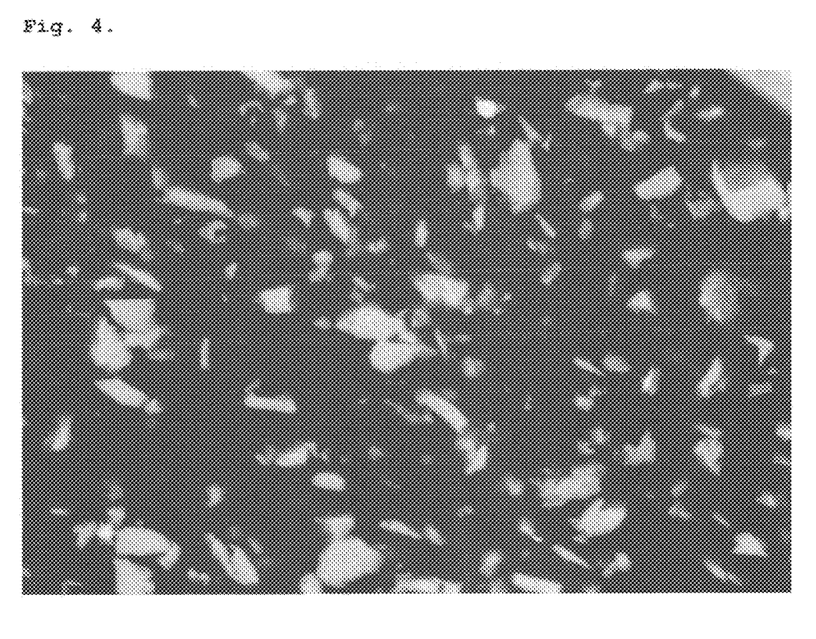
FIG. 4 shows an SEM section through a nonporous Si/C composite produced in a method based on examples 2-4, but without using the Pluronic pore former at 30,000-times magnification.

FIG. 4 shows an SEM section through a nonporous Si/C composite, produced in a method based on examples 2-4, but without using the Pluronie pore former (30,000-times magnification). The silicon particles here are embedded without local macropores into a C matrix, and possess no empty volume for buffering the expansion in Si volume when corresponding lithium-ion batteries are being charged.

The invention claimed is:

1. A method for producing Si/C composite particles comprising:
    a) coating silicon particles with one or more sacrificial organic or inorganic materials selected from the group consisting of oxides, carbonates, carbides, nitrides and sulfides of the elements magnesium, calcium, tin, zinc, titanium and nickel; polyethylene; polypropylene; polystyrene; polybutadiene; poly-tert-butoxystyrene; polyvinyl chloride; polyvinyl acetate; polymethacryl methacrylate; polyacrylic acid; polymethacrylate; polyvinyl stearate; polyvinyl laurate; polyvinyl alcohol; alkylene glycols; polyalkylene oxides; gamma-butyrolactone; propylene carbonate; polyurethanes; and nitrogen-containing solvents,
    b) coating products from stage a) with one or more organic carbon precursors, selected from the group consisting of resorcinol-formaldehyde resin, lignin, and polyacrylonitrile, forming precomposites,
    c) thermally treating the precomposites from stage b), wherein the coating produced in stage b), based on organic carbon precursors, is carbonized and the sacrificial organic or inorganic material is released partly or wholly from the precomposites, forming porous composites, and
    d) coating the porous composites from stage c) with one or more carbon coatings.

2. The method for producing Si/C composite particles as claimed in claim 1, wherein the sacrificial organic materials are selected from the group consisting of polyethylene, polystyrene, polymethacrylate, polyethylene oxide, polypropylene oxide, and polyethylene oxide-polypropylene oxide copolymers.

3. The method for producing Si/C composite particles as claimed in claim 1, wherein polyacrylonitrile is used as the carbon precursor of stage b).

4. The method for producing Si/C composite particles as claimed in claim 1, wherein the porous composites formed in stage c) comprise pores in which there are silicon particles.

5. The method for producing Si/C composite particles as claimed in claim 4, wherein the pores which include silicon particles have diameters of 60 nm to 1400 nm (determined by means of scanning electron microscopy (SEM)).

6. The method for producing Si/C composite particles as claimed in claim 1, wherein in stage d), the porous composites of stage c) are first coated with one or more carbon precursors α), and subsequently the carbon precursors α) are then carbonized by thermal treatment, wherein the carbon precursors α) are selected from the group consisting essentially of tars, pitches, hard carbon, and soft carbon.

7. The method for producing Si/C composite particles as claimed in claim 1, wherein in stage d), the porous composites of stage c) are coated with carbon by chemical vapor deposition using carbon precursors β), wherein the carbon precursors β) are selected from the group consisting of aliphatic hydrocarbons having 1 to 10 carbon atoms; unsaturated hydrocarbons having 1 to 4 carbon atoms; aromatic hydrocarbons, and mixtures thereof.

8. The method for producing Si/C composite particles as claimed in claim 1, wherein the carbon coating on the Si/C composite particles that is applied in stage d) has a porosity of ≤2% (method of determination: 1 minus [ratio of the apparent density (determined by means of xylene pycnometry in accordance with DIN 51901) and the skeletal density (determined by means of He pycnometry in accordance with DIN 66137-2)]).

* * * * *